US010422933B2

United States Patent
Mooney et al.

(10) Patent No.: US 10,422,933 B2
(45) Date of Patent: Sep. 24, 2019

(54) LARGE LIGHTWEIGHT MIRROR FOR A LARGE TELESCOPE

(71) Applicant: HARRIS CORPORATION, Melbourne, FL (US)

(72) Inventors: James Ted Mooney, Rochester, NY (US); Tukaram K. Hatwar, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 16/157,781

(22) Filed: Oct. 11, 2018

(65) Prior Publication Data

US 2019/0086589 A1    Mar. 21, 2019

Related U.S. Application Data

(62) Division of application No. 15/200,560, filed on Jul. 1, 2016, now Pat. No. 10,145,991.

(51) Int. Cl.
*G02B 5/08* (2006.01)
*G02B 7/183* (2006.01)

(52) U.S. Cl.
CPC .......... *G02B 5/0816* (2013.01); *G02B 7/183* (2013.01)

(58) Field of Classification Search
CPC .............................. G02B 5/0816; G02B 7/183
See application file for complete search history.

(56) References Cited

U.S. PATENT DOCUMENTS

| 5,316,564 | A | 5/1994 | Nakamura et al. |
| 6,206,531 | B1 * | 3/2001 | Williams ................. G02B 5/08 |
| | | | 359/846 |
| 8,602,576 | B1 | 12/2013 | Desmitt et al. |
| 2011/0032629 | A1 | 2/2011 | Brittingham et al. |
| 2015/0056415 | A1 | 2/2015 | Southard |

OTHER PUBLICATIONS

Cima et al., "Three Dimensional Printing: Form, Materials and Performance", SFF Symposium, UTexas, 1999—8 pages.
Eckel et al., "Additive Manufacturing of Polymer Derived Ceramics", Science, Jan. 1, 2016, 351—pp. 58-67.
Evans et al., "Rapid Manufacturing of Silicon Carbide Composites", Rapid Prototype Journal, (2005), $^{11}/_{1}$—pp. 34-40.
Gross, B., "Evaluation of 3D Printing and It's Potential Impact on Biotechnology and the Chemical Sciences", Analytical Chemistry, 2014, vol. 86—pp. 3240-3253.

(Continued)

*Primary Examiner* — Jennifer D. Carruth
(74) *Attorney, Agent, or Firm* — RatnerPrestia

(57) ABSTRACT

A process for manufacturing a mirror includes preparing a mirror core by successively depositing a plurality of layers of a core material to form a core structure; and bonding, using a bonding material, the mirror core to a front polishable faceplate and a back faceplate. A mirror includes a mirror core including a plurality of layers of a core material; a front polished faceplate; and a back faceplate. The front polished faceplate and the back faceplate are bonded to the mirror core with a bonding material.

15 Claims, 7 Drawing Sheets

(56) References Cited

OTHER PUBLICATIONS

Herzog et al., "Optical Fabrication of Lightweighted 3D Printed Mirrors", Optomechanical Engineering, 2015, Proc. of SPIE, vol. 9573—pp. 1-14.
Marchelli et al., "The Guide to Glass 3D Printing: Developments, Methods, Diagnostics and Results", Rapid Prototyping Journal, 17/3 (2011)—pp. 187-194.
Mici et al., "Optomechanical Performance of 3D-Printed Mirrors with Embedded Cooling Channels and Substructures", Optomechanical Engineering 2015, edited by Alson E. Hatheway, Proc of SPIE, vol. 9573—pp. 1-15.
Mooney et al., "Lightweight Mirror Construction Optimization", Optifab 2015, vol. 9633—pp. 1-8.
Sweeney, "Application and Testing of Additive Manufacturing for Mirrors and Precision Structures", Material Technologies and Applications to Optics, Structures, Components, and Sub-Systems II, 2015, Proc. of Spie, vol. 9574—pp. 1-13.
Entire patent prosecution history of U.S. Appl. No. 15/200,560, filed Jul. 1, 2016, entitled "Large Lightweight Mirror for a Large Telescope" now U.S. Pat. No. 10,145,991, issued Dec. 4, 2018.

\* cited by examiner

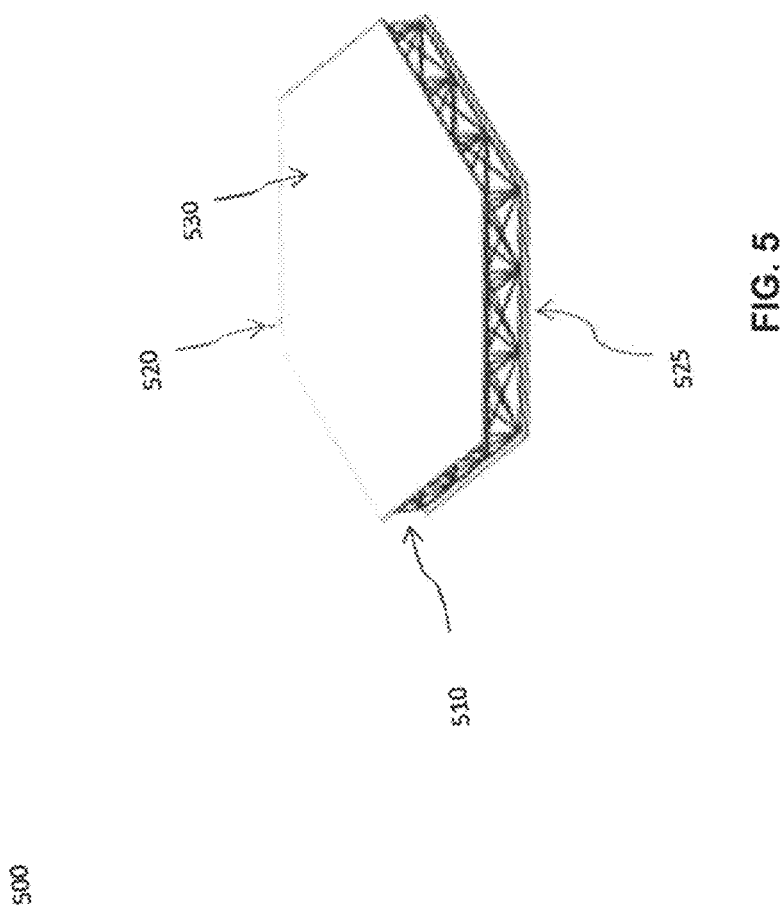

LARGE LIGHTWEIGHT MIRROR FOR A LARGE TELESCOPE

CROSS REFERENCE TO RELATED APPLICATIONS

This application is a divisional of U.S. application Ser. No. 15/200,560, filed Jul. 1, 2016 (Status Allowed), the content of which is incorporated herein by reference in its entirety.

FIELD OF THE INVENTION

This invention relates to mirror architectures and additive processes for producing the same.

BACKGROUND OF THE INVENTION

Large lightweight mirrors are critical components in ground-based, airborne and outer-space-based imaging applications. Traditional mirrors intended for use in outer space drive the full system schedule requiring high cycle times and costs. While there are opportunities to reduce the cost and schedule in the manufacture of lightweight core, open- and closed-back mirrors, typically only nominal advances have been previously enabled.

Present methods of manufacturing a mirror for large telescopes involve reducing the weight of mirror by traditional abrasive water jetting (AWJ) or precision machining of a large boule, in which almost 95% material is eventually discarded. Such processing can take up to 2 years from ordering the glass boules to finishing. Due to these long cycle times, completed optical systems can take 3-4 years to manufacture. Corning's ULE® is commonly used for telescope mirrors.

Advanced ceramics and carbon composite materials have been offered as cost- and schedule-reducing alternatives to Corning ULE®, due to the high stiffness at relatively low mass and thermal expansion of these materials. However, mirrors based on carbon composite have issues with long term stability, and can suffer from deterioration based on thermal and hygro absorption. Fabrication of a composite core also requires precise layering of the carbon fiber prepreg, orientation, autoclaving and significant machining.

Current processes for producing mirrors do not allow for the rapid and low cost deployment of precision imaging capabilities.

SUMMARY OF THE INVENTION

Aspects of the invention relate to mirrors, processes for manufacturing mirrors, as well as mirrors produced according to the disclosed methods.

In accordance with one aspect, the invention provides for a process for manufacturing a mirror and a mirror produced thereby. The process includes preparing a mirror core by successively depositing a plurality of layers of a core material to form a core structure; and bonding, using a bonding material, the mirror core to a front polishable faceplate and a back faceplate.

In yet another aspect, the invention provides a mirror. The mirror includes a mirror core including a plurality of layers of a core material; a front polished faceplate; and a back faceplate. The front polished faceplate and the back faceplate are bonded to the mirror core with a bonding material.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 5 is a schematic illustration of a mirror in accordance with aspects of the present invention;

DETAILED DESCRIPTION OF THE INVENTION

Aspects of the invention relate to mirrors, processes for manufacturing mirrors, as well as mirrors produced according to the disclosed methods.

The inventors have discovered the use of additive processes, such as 3D printing, to generate mirror cores which may then be bonded to faceplates generated by replication technology. The details of the capture range replication (CRR) are given in a publication by J. T. Mooney et al, Proc. SPIE, Volume 9633, pages 96330-Z 1-8. This invention not only provides mirror architecture that is lighter weight than conventional mirror architecture, but can also desirably reduce primary mirror schedules and cost by orders of magnitude. For example, the inventive processes can enable: 1) weight reduction in mirrors and mounts; 2) telescope manufacturing schedule reduction (e.g., by >70%); and 3) overall mirror manufacturing cost reduction (e.g., by >50%).

Figure 1:
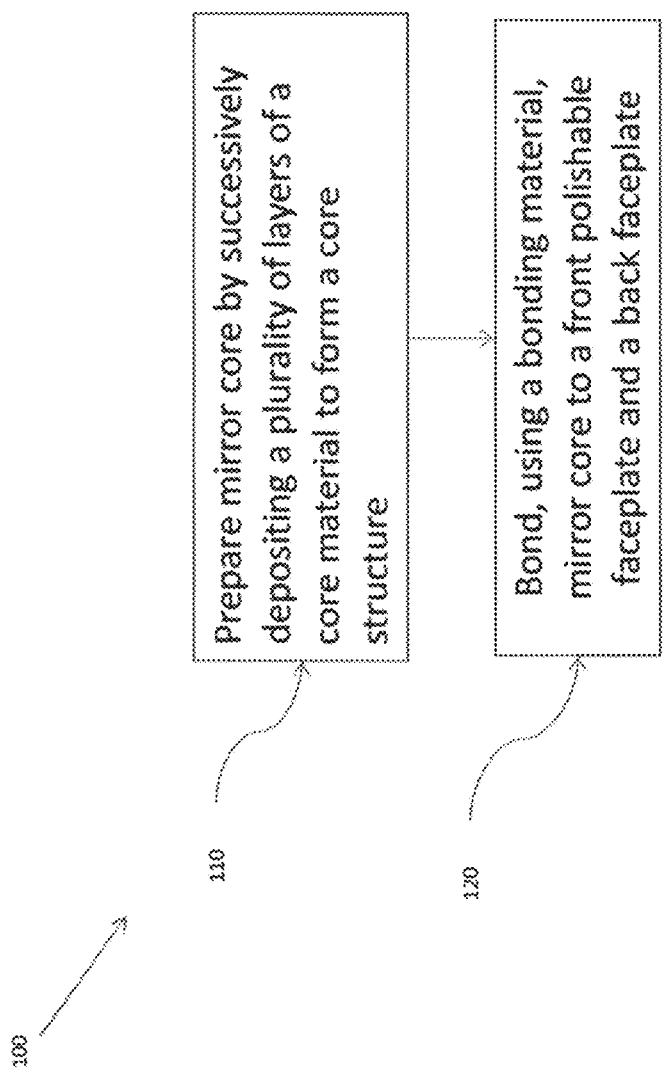
FIG. 1 is a flow diagram of a process for manufacturing a mirror in accordance with aspects of the present invention.

In FIG. 1, a flow diagram depicting selected steps of a process 100 for producing a mirror according to aspects of the invention is shown. It should be noted that, with respect to the processes described herein, it will be understood from the description herein that one or more steps may be omitted and/or performed out of the described sequence of the process while still achieving the desired result.

In step 110, a mirror core is prepared by successively depositing a plurality of layers of a core material to form a core structure. 3 dimensional printing may be used to successively deposit layers of core material to form the core structure. As used herein, "3D printing" or "3 dimensional printing" is an additive manufacturing process in which a plurality of layers of a material are successively deposited to create a physical object. 3D printing methods include Ink Jet Printing, in which powdered materials are deposited in layers, and areas are selectively bound by deposition of a binder by ink jet printing. The unbound powder is removed following sequential application of layers, resulting in a three dimensional printing. The printed structure is dried, and post processed at high temperatures for obtaining strength and desired properties. The details of this technique can be found in a publication by M J Cima and E M Sachs, "Three dimensional Printing: Form, Materials and Performance", SFF Symposium, UTexas, 1999," the entirety of which is incorporated by reference herein Exemplary 3D printing processes also include Direct Ink Writing, in which an ink slurry made of blended material powder material and colloidal suspension binder is printed thru fine nozzle and rapid solidification, further reference to the details of this technique is provided by "The guide to glass 3D printing: developments, methods, diagnostics and results," G. Marchelli et al, Rapid Prototype Journal, 17/3 (2011) 187-194, the entirety of which is incorporated by reference herein.

Selective Laser Sintering (SLS) may also be used for 3D printing of metals, ceramics and other parts. SLS is similar to ink jet printing and it uses a high power laser (e.g. $CO_2$) to sinter polymer, metal, or ceramic powders to generate a 3D model, rather than using liquid binding materials to glue powder particles together. Other 3D printing techniques are Stereolithography (SLA), Fused Deposition Modelling (FDM) and Laminated Object Manufacturing which can be tailored to fabricate a variety of 3D printed materials including plastics, metals, and ceramics. These techniques are summarized in a publications by B C Gross, Evaluation of 3D Printing, Analytical Chemistry, (2014), 86, 3240-53; Z C Eckel et al, Additive manufacturing of polymer derived ceramics, Science, 1 Jan. 2016, 351, 6528, the entirety of which are incorporated by reference herein. Various intermediate steps may be adjusted to obtain desired mechanical and other properties of the printed core as descried in the publication "Rapid Manufacturing of silicon carbide composite by R S Evans et al, Rapid Prototype Journal (2005), 11/1, 37-40," the entirety of which is incorporated by reference herein.

Through the use of 3D printing, a variety of core materials may be used in step 110. Various commercial printers are available for printing plastic, metals and carbon composite materials in small to large sizes. Commercial printers for printing of ceramics and glass materials are under development.

Preparation of low CTE core material for 3D printing can be achieved by rendering the starting materials in powder form. Using ULE glass as an example, large glass pieces can be fractured into small pieces, ball milled into granules, and sieved thru to obtain certain particle size distribution. Alternatively, granules may be obtained by atomization where the glass is rendered molten and atomized through a fine orifice using argon or neutral gas.

Each of the 3D printing process steps may be optimized. For example, optimization may be performed with respect to the selection of the powder and binder materials, printing parameters, and post deposition processing like drying, sintering, infiltration or any additional step of post processing of material which may need to be optimized. Starting powder materials can be spherical or non-spherical in the range 5-100 um, and micron sized particle powder can be mixed with nano powder of the same or different material. A sintering process may be used to increase material strength, and may be conducted at temperatures closest to the melting point and for a long duration to ensure maximum densification. Amorphous material may begin to crystallize at these temperatures and an increase in crystallinity directly impacts CTE. Therefor sintering temperature and hold time, and ramp up heating and ramp down cooling rates may be controlled/optimized for obtaining materials exhibiting low CTE, high strength and low risk of fracturing.

Densification is also impacted by temperature and can be driven by particle size. Smaller particles, particularly less than 0.4 um range sinter more readily at lower temperature, and smaller particles and mixed with larger particles to obtain high densification. The powder material can be spherical or non-spherical, and mixture of both micro and nano size particles can be used for obtaining high density in the powder bed and uniform layering. Powders can also be mixed with other materials, such as binders. Layer thickness during printing are set to at roughly 2-3 time the average particle size, but optimum layer thickness may be desirable for layer uniformity and high resolution.

Core materials may have one or more physical properties that are well-suited for space-based imaging equipment. It is preferred to minimize the coefficient of thermal expansion (CTE), minimize weight, and maximize the modulus of elasticity.

For example, core materials may be characterized by a low coefficient of thermal expansion. Core materials used in process 100 may have a coefficient of thermal expansion in the range from +/−0.03 to 10 ppm/degree Centigrade and more preferably in the range from 0.02 to 5 ppm/degree Centigrade. Core materials may also have a density in the range from 1.8 to 3.5 gm/cc and more preferably in the range from 1.85 to 3.2 gm/cc. Core materials may also have a modulus of elasticity (E) in the range of 60 to 500 GPa and more preferably in the range from 60 to 100 GPa.

It should be noted that core materials used in process 100 need not have all of the aforementioned physical properties in the specified ranges. Rather, depending on parameters such as cost and schedule, core materials may have one or more of a stiffness (i.e. modulus of elasticity), coefficient of thermal expansion, and density within the specified ranges above. Moreover, depending on the core material used, one of ordinary skill in the art will understand that there may be tradeoffs among the preferred physical properties of low coefficient of thermal expansion, low density, and high stiffness (e.g., a material having a high stiffness may have a higher than preferable density).

Exemplary core materials having one or more of the aforementioned physical properties include one or a combination of a silicon carbide material, a ceramic material, fused silica, a ceramic-doped polymeric material, a glass-ceramic material, an ultra low expansion glass material, a carbon nanotube-filled polymeric material, and a carbon composite material. Preferred materials include ULE® ultra low expansion glass (Corning Inc., Corning, N.Y.), Zerodur® glass-ceramic (Schott AG, Mainz, Germany), ClearCeram® glass-ceramic (O'Hara Corp., Branchburg, N.J.), and Astrositall glass-ceramic.

Figure 2:
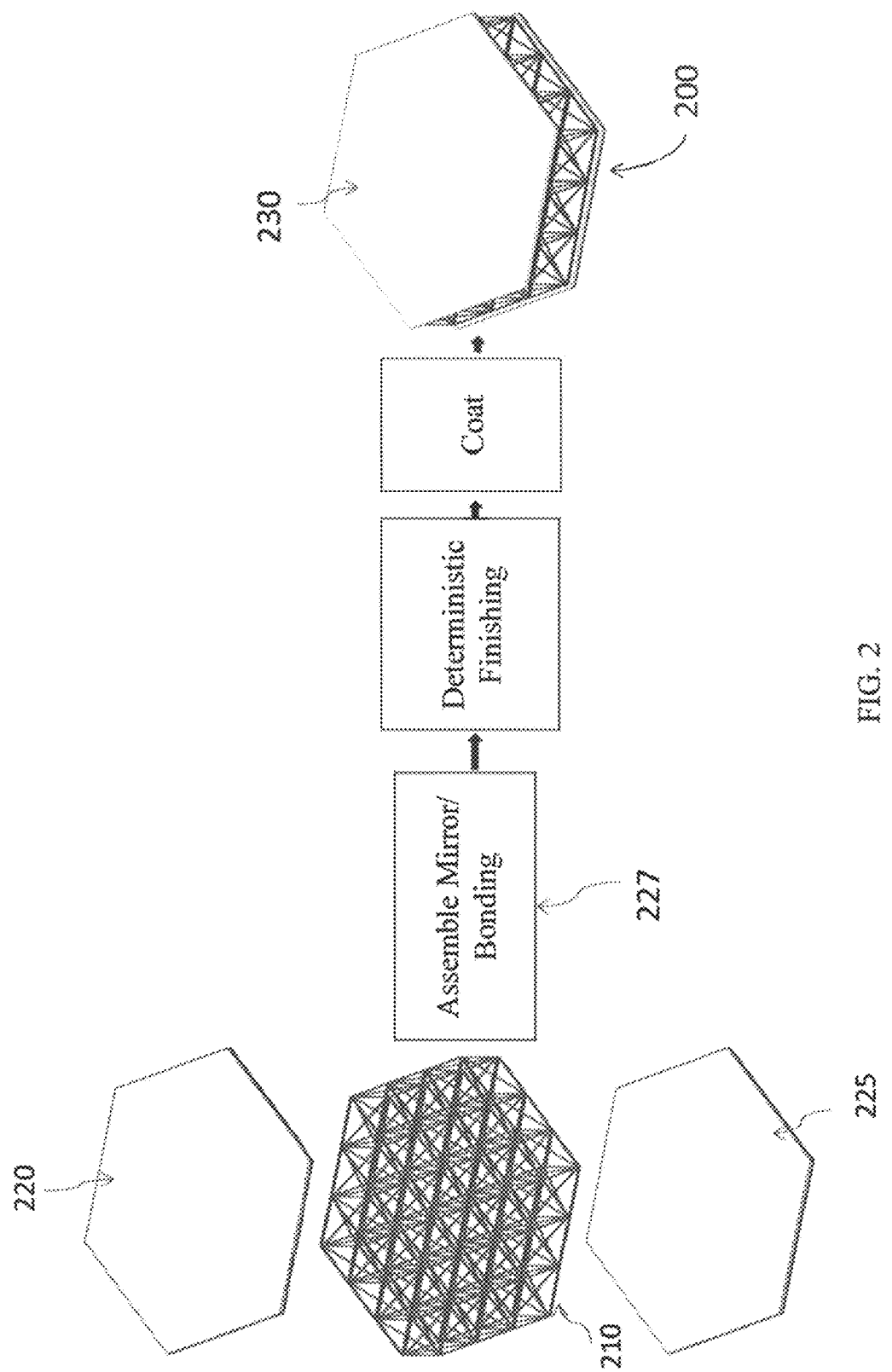
FIG. 2 is a schematic illustration of a process for manufacturing a mirror in accordance with aspects of the present invention.
Figure 3B:
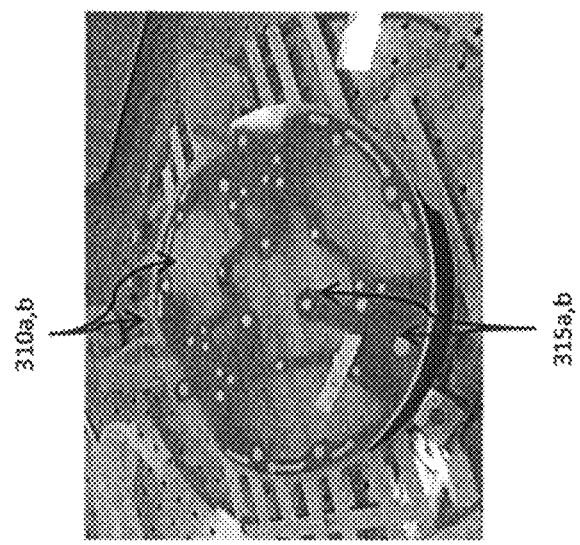
FIG. 3b is a photograph of a 3D printed free form continuous core structure bonded to front and back faceplates in accordance with aspects of the present invention.
Figure 3A:
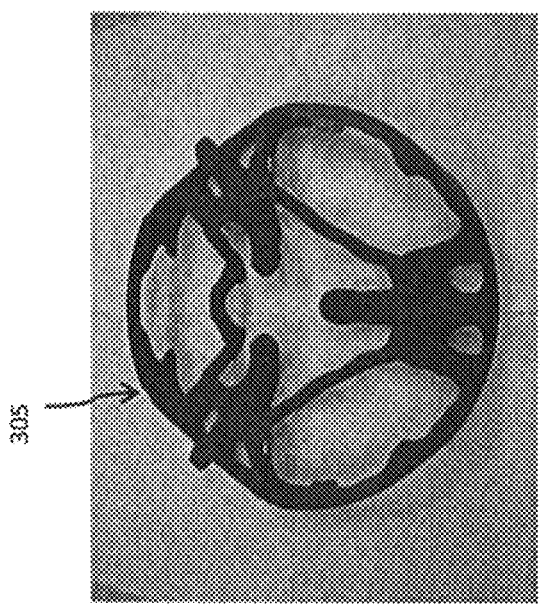
FIG. 3a is a photograph of a 3D printed free form continuous core structure in accordance with aspects of the present invention.
Figure 4B:
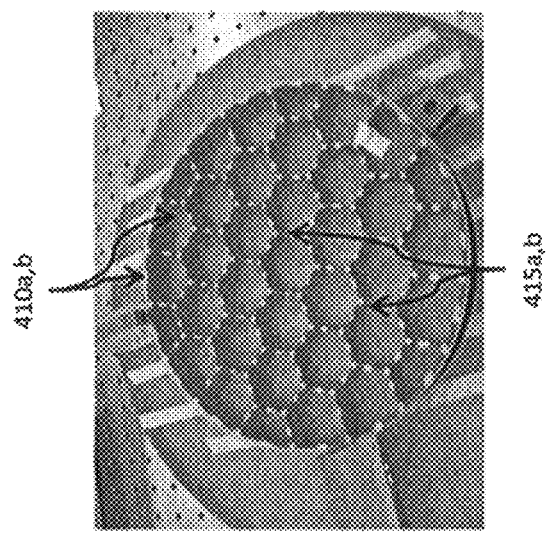
FIG. 4b is a photograph of a 3D printed traditional honeycomb core structure bonded to front and back faceplates in accordance with aspects of the present invention.
Figure 4A:
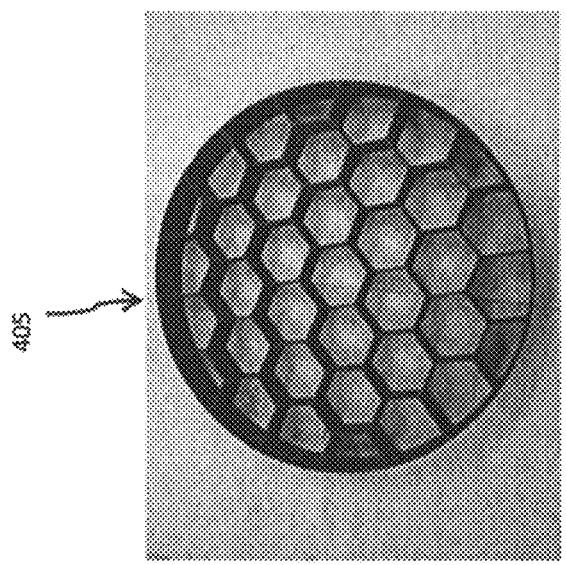
FIG. 4a is a photograph of a 3D printed traditional honeycomb core structure in accordance with aspects of the present invention.

In one embodiment, the successively deposited layers forming the core structure may be 3D printed using a computer aided design (CAD) model or scan file of the core structure as an input to the 3D printing operation. 3D printing can be used to translate complex virtual solid model data into physical models in a short period of time and without incurring significant expense. In this respect, 3D printing provides great flexibility with respect to the production of a variety of core structures. Core design can be optimized to provide optimum stability, stiffness, mass, and face plate deflection. Traditional honeycomb structures as depicted in FIG. 4a, truss structures as shown in FIG. 2, as well as free form continuous core structures as depicted in FIG. 3a, may be produced using the 3D printing methods disclosed herein. One of ordinary skill in the art will understand, upon reading this disclosure that other core structures and configurations are achievable using the inventive methods described herein.

Lightweight core structures are preferred to minimize the overall weight of the mirrors, and therefore to minimize the cost of transporting the mirrors into outer space. Accordingly core structures can be characterized in terms of specific stiffness, (density ($\rho$)/modulus of Elasticity (E)), and steady state thermal distortion coefficients (CTE/k), where CTE is the coefficient of thermal expansion and k is the thermal conductivity. Lower specific stiffness and lower steady state thermal distortion 3a coefficient are preferred for the core materials. Materials with a relatively low specific stiffness and low steady state thermal distortion coefficients can be fabricated using designs. It should be understood, however, that the invention is not limited to any specific core designs or materials. In one embodiment, successive layers of fused silica, are deposited one by one and fused together, with this additive manufacturing process repeated until a traditional honeycomb core structure having a specific stiffness and mass is achieved. 3D printing enables core structure optimization which minimizes mass while simultaneously maintaining a high stiffness.

The mirror core can be optimized using software-based structural design optimization or experience based design optimization. Non-limiting examples of standard optimization platforms include solidThinking Inspire® (solidThinking, Inc., Troy, Mich.) and HyperWorks® (Altair, Burlington, Mass.). The optimization objectives for the three dimensional topology of the core structure may include minimum weight, maximum stiffness and minimal surface deformation of the mirror in gravity and stability.

In one embodiment, a non-continuous core may be printed for the production of a mirror where a plurality of smaller core components or segments can be combined to construct a large mirror. Larger size cores are difficult to fabricate and smaller segments offer fabrication advantages relative to a large monolithic core. Smaller size core segments which are light weight, and are thermally, mechanically, and environmentally stable can be made with much lesser difficulty. The smaller size core segments may then be bonded together to form a larger core, such as through one or more processes including low temperature fusion, direct laser bonding, reactive bonding, hydroxide bonding, anodic bonding, and low temperature metallic solder bonding, thermal cure adhesive bonding and UV cure adhesive bonding.

Figure 7:
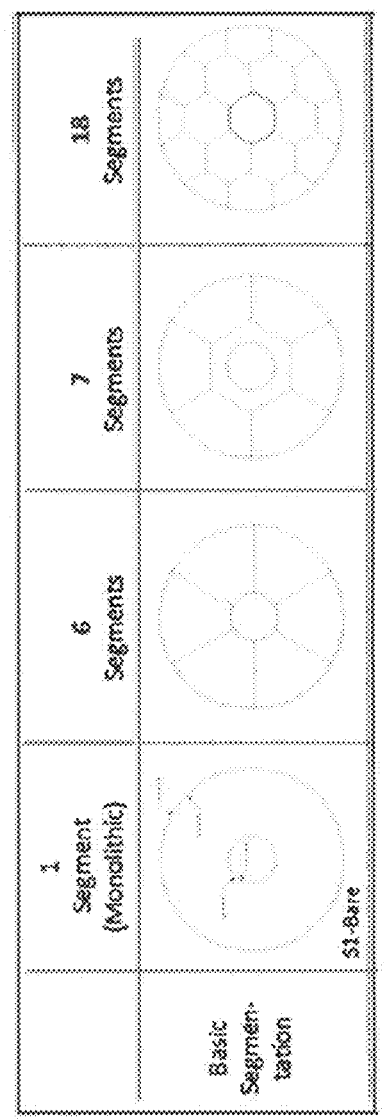
FIG. 7 is a schematic illustration of various composite core structures formed from a plurality of smaller core segments in accordance with aspects of the present invention.

As an example, FIG. 7 depicts various options for forming a larger composite core from a plurality smaller core components/segments.

Additional 3D printed structures can be incorporated into the mounted mirror design to optimize assembled mirror performance. Exemplary structures include the mounts and other support structures. Back-mounted or edge mounted pads may be used to hold the telescope mirror in place. Back mounted pads are either bonded to the core or to the back face plate. When pads are bonded to the core, extra support material such as thicker ribs or more ribs may be placed where the pads are mounted to distribute the stress. These support structures and any additional structure can be added in the core design.

In one embodiment, mounting and hardware interfaces for alignment with the front and back faceplates may be 3D printed directly or indirectly on the mirror core.

In step 120, the mirror core is bonded to a front polishable faceplate and a back faceplate.

Suitable materials for the front polishable faceplate and back faceplate include one or more of an ultra low expansion glass material, a fused silica material, a carbon composite material, an silica carbide material, and a beryllium material. Exemplary materials include ULE® (Corning Inc., Corning, N.Y.), Zerodur® (Schott AG, Mainz, Germany), ClearCeram® (O'Hara Corp., Branchburg, N.J.), and Astrositall. ULE® in particular has a very low coefficient of thermal expansion and exhibits virtually no dimensional changes across a wide spectrum of temperatures. This high resistance to thermal expansion makes ULE® similarly resistant to thermal shock, rendering it a particularly suitable material for space-based application. ULE® has a coefficient of thermal expansion of about $10^{-8}$/K at 5-35° C. Other physical properties of ULE® include a thermal conductivity of 1.31 w/(m ° C.),), thermal diffusion of 0.0079 cm$^2$/s, a mean specific heat of 767 J/(kg ° C.), and a strain point of 890° C. ULE® is also recyclable, making it an attractive material from a cost control standpoint. Various grades of ClearCeram® have a typical advertised coefficient of thermal expansion ranging from $+2 \times 10^{-8}$/K (CCZ Regular) to $-8 \times 10^{-8}$/K (CCZ HS) in the range of −60 to 160° C. Astroinstall has a mean linear coefficient of thermal expansion of $10^{-7}$/K in the range of −60 to 60° C. Thus, as used herein, the term "ultra low expansion" glass means a glass having a coefficient of thermal expansion of less than $10^{-7}$/K in a range of 5-35° C.

One or both of the front polishable faceplate and back faceplate may be comprised of the same or different material(s) as the core material of the mirror core produced in step 110. However, in certain embodiments, it is preferred to use the same materials for the front polishable faceplate and back faceplate.

In one embodiment, front polishable faceplate and back faceplate are replicated to near-final specification. That is, the faceplates are replicated to achieve optical surfaces within capture range of final deterministic optical finishing process. Further details regarding capture range replication (CRR) are given in a publication by J. T. Mooney et al, Proc. SPIE, "Lightweight mirror construction optimization," Volume 9633, pages 9633 0Z 1-8, the entirety of which is hereby incorporated by reference. By fabricating faceplates within capture range replication, early processing steps (such as rough generating, rough shaping, fine grinding, and rough polishing) may be eliminated, and the near-final specification faceplates are ready to proceed directly to final deterministic finishing by either/or magneto rheological finishing (MRF®), ion finishing, and other deterministic finishing methods. Near-final specification processing includes subjecting the faceplates to close contact slumping.

In one embodiment, front polishable faceplate and back faceplate are replicated to near-final specification prior to bonding step 120.

The mirror core is bonded to both the front polishable faceplate and back faceplate, thereby forming a closed back advanced mirror. Bonding may be accomplished through one or more processes including low temperature fusion, direct laser bonding, reactive bonding, hydroxide bonding, anodic bonding, and low temperature metallic solder bonding, thermal cure adhesive bonding and UV cure adhesive bonding.

The bonding material used to bond the mirror core to the front polishable faceplate and back faceplate may be selected to so as to provide maximum accommodation between any mismatch of the core material(s) vis-à-vis the materials used for the front polishable faceplate and back faceplate. A relatively low Young's modulus, e.g., a Young's modulus in the range from 0.5 GPa to 5 GPa and more specifically in the range from 0.6 GPa to 4 GPa, can better accommodate any differences between the material properties of core material(s) and the front polishable faceplate and back faceplate.

In another embodiment, the bonding material has one or more properties selected from adhesive strength in the range from 15 MPa to 70 MPa, more specifically in the range from 15 to 40 MPa; a coefficient of thermal expansion in the range from 5-100 ppm/degree C., more specifically from 10-50 ppm/degree C.; and a coefficient of moisture expansion in the range from 1500 to 5000 microinches/inch % moisture, more specifically in the range from 2000 to 3500 microinches/inch % moisture.

Bonding materials having one or more of the aforementioned properties can be selected from one or more of: a solder alloy, a UV-curable adhesive, thermally cure adhesive, low temperature fusion and a ceramic frit.

One of ordinary skill in the art will understand that each bonding material/bonding method has its own advantages and drawbacks. For example, frit bonding offers a high bond strength and a low coefficient of thermal expansion, but it requires the bonding surface to be heated to a high temperature. Adhesive epoxies have adequate bonding strength and low linear shrinkage, but high outgassing and high coefficient of thermal expansion. Stable and high strength adhesives are cost and time effective and have suitable mechanical strength.

Turning to FIG. 2, a schematic diagram illustrating selected steps of the above described process for producing a mirror 200 according to aspects of the invention is to shown. A mirror core 210 is prepared by successively depositing a plurality of layers of a core material to form a core structure. In the depicted embodiment, the 3D printing process is used to impart a honeycomb-like structure to mirror core 210.

Separately, a front polishable faceplate 220 and a back faceplate 225, both comprised of ULE®, are subjected to flat grinding and polishing. Front polishable faceplate 220 and back faceplate 225 are subsequently processed to capture replication range through a close contact slumping process.

Mirror core 210 is subsequently bonded to front polishable faceplate 220 and back faceplate 225, which have been previously processed to a near-final specification (i.e., capture replication range). Any of the aforementioned bonding materials or processes may be used.

Front polishable faceplate 220 and back faceplate 225 of the bonded assembly 227 are then processed according to one or more deterministic finishing processes to achieve a desired optical specification. One or both of magneto rheological finishing (MRF), ion finishing or other deterministic finishing processes may be used.

After the deterministic finishing process(es), final optical testing is done for optical surface figure error and surface smoothness.

After optical testing is complete, a multilayer stable reflecting coating 230 is deposited on one or both of the front polishable faceplate and the back faceplate. In one embodiment, multilayer stable reflecting coating 230 is comprised of durable and reflective materials such as gold, silver, and/or aluminum. One of ordinary skill in the art will understand that the selection of the material for multilayer stable reflecting coating 230 depends upon the degree of reflectivity required for the intended application and environment. Suitable thicknesses for multilayer stable reflecting coating in the range from 100 to 500 nm, more specifically in the range of 200 nm to 300 nm.

FIG. 3*a*, which is a photograph of a 3D printed free form continuous core structure according to aspects of the present invention, demonstrates the flexibility of the 3D printing process. Mirror core 305 was printed using acrylonitrile styrene acrylate (ASA) plastic as a source material. FIG. 3*b* depicts the assembled mirror 300, which includes faceplates 310*a,b* adhesively bonded to mirror core 305. Various bonding points 315*a,b* between mirror core 305 and faceplates 310*a,b* are shown.

FIG. 4*a* is a photograph of a 3D printed traditional honeycomb type core structure according to aspects of the present invention. Mirror core 405 was printed using ASA plastic as a source material. FIG. 4*b* depicts the assembled mirror 400, which includes faceplates 410*a,b* adhesively bonded to mirror core 405. Various bonding points 415*a,b* between mirror core 405 and faceplates 410*a,b* are shown.

In another embodiment, a mirror is provided. With reference to FIG. 5, mirror 500 includes a mirror core 510 made of a plurality of layers of a core material. Mirror core 510 may be comprised of any of the materials disclosed above, and may be structured according to any of the disclosed structures (e.g., continuous free form, honeycomb, etc.)

Mirror 500 also includes front polished faceplate 520 and back faceplate 525. Front polished faceplate 520 and back faceplate 525 have been prepared to optical specification using, e.g., capture replication range processing as well as one or more deterministic finishing processes (such as magneto rheological finishing (MRF), ion finishing and/or other deterministic finishing).

Front polished faceplate 520 and back faceplate 525 are bonded to the mirror core 510 with an adhesive bonding material. Any of the bonding materials and processes disclosed herein may be incorporated in mirror 500.

Mirror 500 also includes multilayer stable reflecting coating 530 on one or both of front polished faceplate and the back faceplate.

Figure 6:
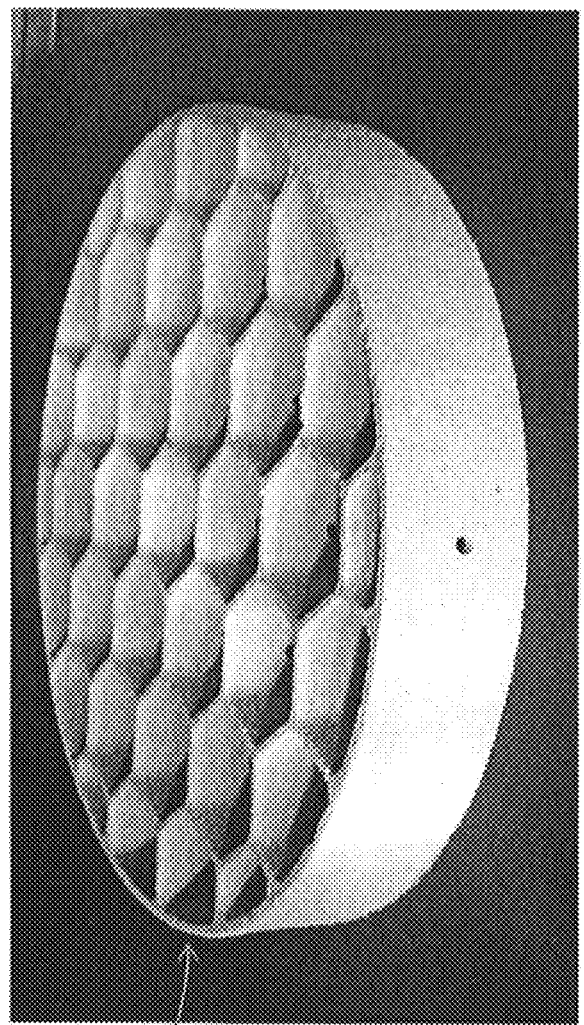
FIG. 6 is a fused silica core printed using Ink Jetting 3D printing method in accordance with aspects of the present invention.

A fused silica honeycomb core 15 cm in diameter and 2.5 cm (height) with 0.2 cm wall thickness was prepared using a binder Ink Jetting 3D printing method in accordance with aspects of present invention and is shown in FIG. 6. Fused silica powder (typical particle size 10-30 um) in size was mixed with nano silica (typical particle size 5-20 nm). The .STL fine of the CAD design of the core structure was input to the Z Corporation 3D printer machine. The powder mixture was spread in the powder bed. The powder was then jetted with nano silica colloidal binder to create the designed part. The part was dried, and sintered up to 1500 degree C. with specific ramp rates to drive off the binder liquid and sinter the part into a solid geometry. Further processing such as nano silica infiltration was done to improve the strength of the core.

In yet another embodiment, a mirror produced according to any of the aforementioned processes is disclosed.

The inventive processes and mirrors disclosed herein offer significant cost and time reductions over the prior art, while providing optimized mirror architecture suitable for ground based, airborne and outer-space based applications. Complex mirror geometries (including segmented core mirrors) are made possible through the disclosed inventive processes and mirrors.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A mirror for a ground-based, airborne or outer-space-based telescope, the mirror comprising
    a mirror core including a plurality of layers of a core material;
    a front polished faceplate comprising a front faceplate material; and
    a back faceplate comprising a back faceplate material,
    wherein the front polished faceplate and the back faceplate are bonded to the mirror core with a bonding material, wherein the bonding material is different from the front faceplate material, the back faceplate material, and the core material.

2. The mirror of claim 1, wherein the mirror core comprises a plurality of core segments bonded together.

3. The mirror of claim 1, wherein one or more of the front faceplate material and the back faceplate material comprise a same material as the core material.

4. The mirror of claim 1, wherein the plurality of layers of the core material are the product of an additive manufacturing process.

5. The mirror of claim 4, where the additive manufacturing process is a 3D printing process.

6. The mirror of claim 1, wherein the front polished faceplate and the back faceplate are bonded to the mirror core via a bond selected from the group consisting of: a low temperature fusion bond, a direct laser bond, a reactive bond, a hydroxide bond, an anodic bond, a low temperature metallic solder bond, a thermal cure adhesive bond and UV cure adhesive bond.

7. The mirror of claim 1 further comprising a multilayer stable reflecting coating on one or both of the front polishable faceplate and the back faceplate.

8. The mirror of claim 1, wherein the core material has one or more properties selected from: a coefficient of thermal expansion in the range from +/−0.03 to 10 ppm/degree Centigrade, a density in the range from 1.8 to 3.5 gm/cc, and a modulus of elasticity in the range of 40 to 500 GPa.

9. The mirror of claim 1, wherein the core material comprises one or more of: a silicon carbide material, a ceramic material, a ceramic-doped polymeric material, a carbon nanotube-filled polymeric material, a glass-ceramic material, a carbon composite material, fused silica, and ultra low expansion glass.

10. The mirror of claim 8, wherein the glass ceramic material has a coefficient of thermal expansion in the range from +/−0.03 to 10 ppm/degree Centigrade.

11. The mirror of claim 1, wherein one or more of the front faceplate material and the back faceplate material comprises a same material as the core material.

12. The mirror of claim 1, wherein the bonding material has one or more properties selected from adhesive strength in the range from 15 MPa to 70 MPa, a coefficient of thermal expansion in the range from 5 to 100 ppm/degree C., and a coefficient of moisture expansion in the range from 1500 to 5000 micro-inches/inch % moisture.

13. The mirror of claim 1, wherein the bonding material has a Young's modulus in the range from 0.5 to 5 GPa.

14. The mirror of claim 1, wherein the bonding material comprises one or more of: a solder alloy, a thermal cure adhesive, a UV-curable adhesive, a ceramic frit, direct laser bonding and low temperature fusion.

15. The mirror of claim 1, wherein one or both of the front polishable faceplate and the back faceplate comprises one or more of an ultra-low expansion glass material, a glass-ceramic material, a fused silica material, a carbon composite material, a beryllium material and silicon carbide material.

* * * * *